US009911446B1

(12) United States Patent
Ahner et al.

(10) Patent No.: US 9,911,446 B1
(45) Date of Patent: Mar. 6, 2018

(54) THREE DIMENSIONAL DATA STORAGE MEDIA

(71) Applicant: Seagate Technology LLC, Cupertino, CA (US)

(72) Inventors: Joachim Ahner, Livermore, CA (US); David M. Tung, Livermore, CA (US); Ganping Ju, Pleasanton, CA (US); Philip L. Steiner, Los Altos, CA (US); Thomas P. Nolan, Fremont, CA (US); Thomas Y. Chang, Menlo Park, CA (US); Pin-Wei Huang, Fremont, CA (US); Kaizhong Gao, North Oaks, MN (US); Timothy Klemmer, Union City, CA (US); David S. Kuo, Palo Alto, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/640,924

(22) Filed: Jul. 3, 2017

Related U.S. Application Data

(63) Continuation of application No. 15/165,637, filed on May 26, 2016, now Pat. No. 9,697,857.

(60) Provisional application No. 62/168,478, filed on May 29, 2015, provisional application No. 62/169,609, filed on Jun. 2, 2015, provisional application No. 62/169,611, filed on Jun. 2, 2015, provisional application No. 62/169,779, filed on Jun. 2, 2015, provisional application No. 62/209,238, filed on Aug. 24, 2015.

(51) Int. Cl.
*G11B 11/00* (2006.01)
*G11B 5/66* (2006.01)
*G11B 5/65* (2006.01)
*G11B 5/00* (2006.01)

(52) U.S. Cl.
CPC ............... *G11B 5/66* (2013.01); *G11B 5/653* (2013.01); *G11B 5/656* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 6,566,872 B1 | 5/2003 | Sugitani | |
| 7,602,588 B2 | 10/2009 | Sato et al. | |
| 8,164,854 B2 | 4/2012 | Takagishi et al. | |
| 8,289,821 B1 | 10/2012 | Huber | |
| 8,460,805 B1 | 6/2013 | Gao et al. | |
| 8,514,672 B2 | 8/2013 | Grobis et al. | |
| 8,553,358 B2 | 10/2013 | Mizushima et al. | |
| 8,630,070 B2 | 1/2014 | Sato et al. | |
| 8,634,163 B2 | 1/2014 | Tanabe et al. | |
| 8,658,292 B1 | 2/2014 | Mallary et al. | |
| 8,891,341 B1 | 11/2014 | Krichevsky et al. | |

(Continued)

*Primary Examiner* — Peter Vincent Agustin
(74) *Attorney, Agent, or Firm* — Hall Estill Attorneys at Law

(57) ABSTRACT

A three dimensional magnetic recording media can consist of a coupling layer disposed between first and second vertically stacked recording layers. The coupling layer can provide exchange or antiferromagnetic coupling and allow the respective recording layers to be individually heat selected to different first and second coupling strengths through application of heat from a heat source.

20 Claims, 6 Drawing Sheets

(56) References Cited

U.S. PATENT DOCUMENTS

| | | | |
|---|---|---|---|
| 9,007,720 B2 | 4/2015 | Fukuzawa et al. | |
| 9,030,783 B1 | 5/2015 | Braganca et al. | |
| 9,697,857 B1* | 7/2017 | Ahner | G11B 5/66 |
| 2005/0163962 A1* | 7/2005 | Kawato | G11B 5/656 |
| | | | 428/848.1 |
| 2010/0309580 A1 | 12/2010 | Tonooka et al. | |
| 2011/0019527 A1 | 1/2011 | Mueller et al. | |
| 2011/0143169 A1 | 6/2011 | Albrecht et al. | |
| 2012/0092972 A1 | 4/2012 | Taratorin et al. | |
| 2012/0224283 A1 | 9/2012 | Sato et al. | |
| 2012/0251845 A1 | 10/2012 | Wang et al. | |
| 2013/0070361 A1* | 3/2013 | Yang | G11B 5/66 |
| | | | 360/55 |

\* cited by examiner

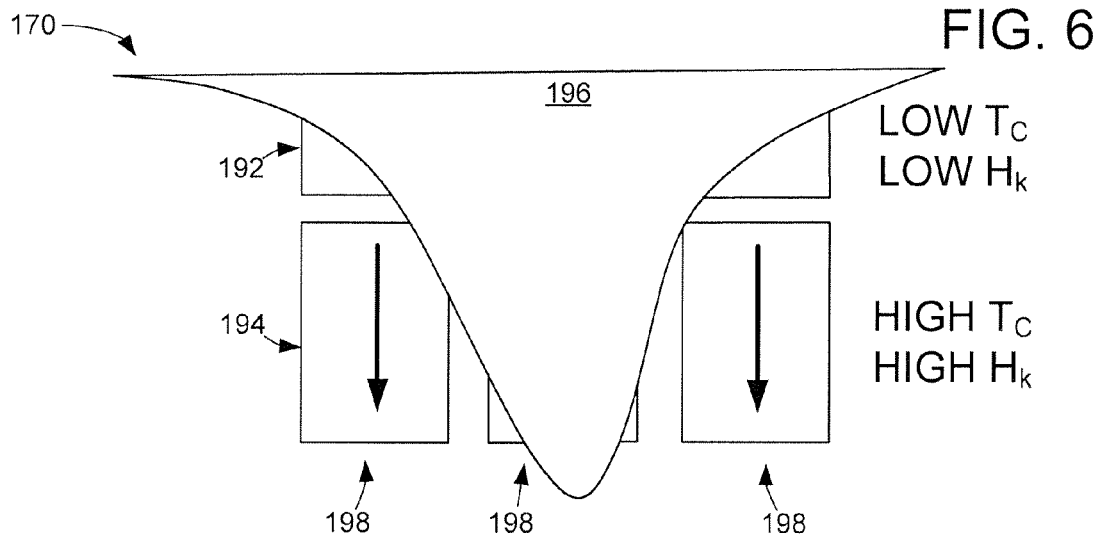
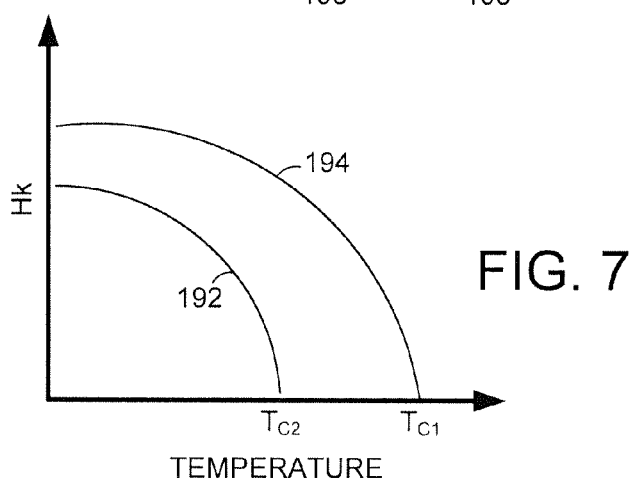
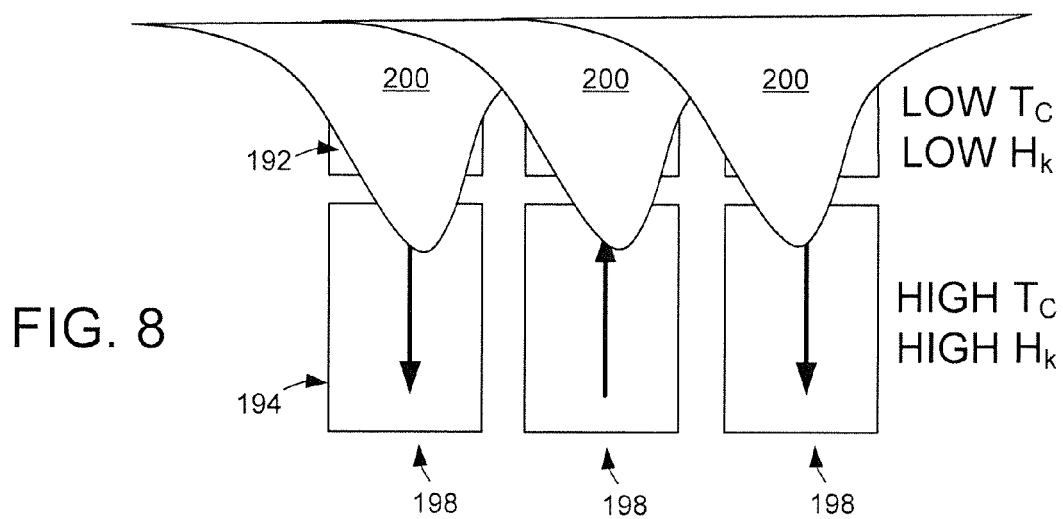

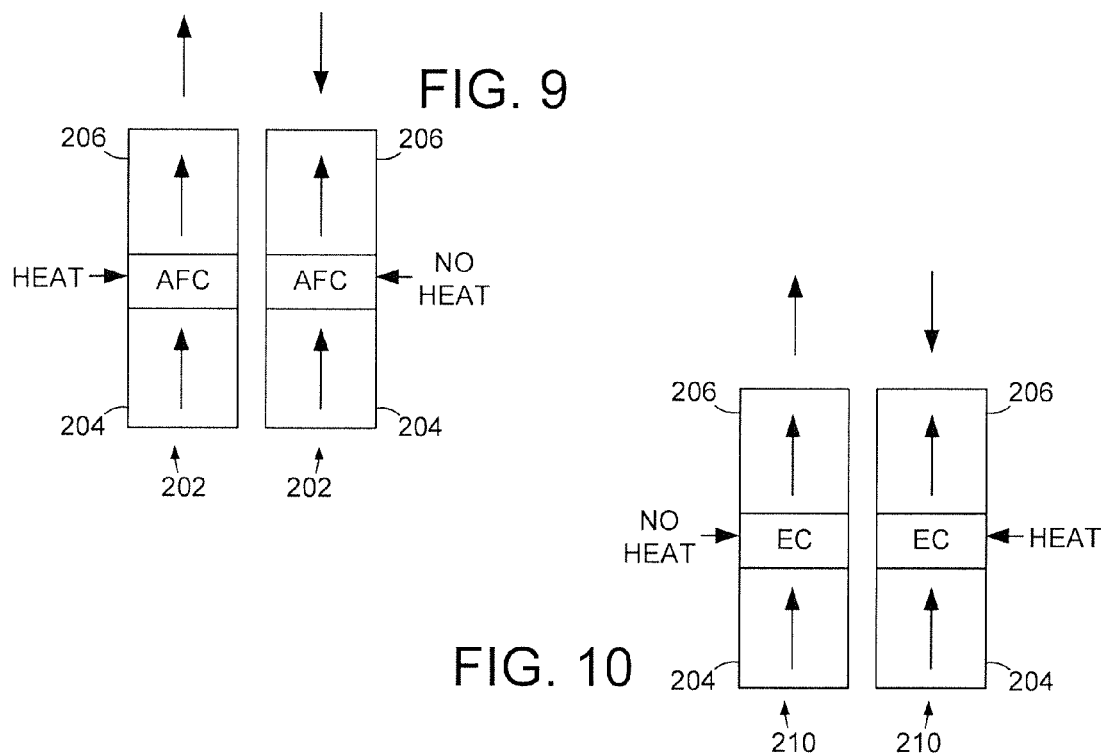
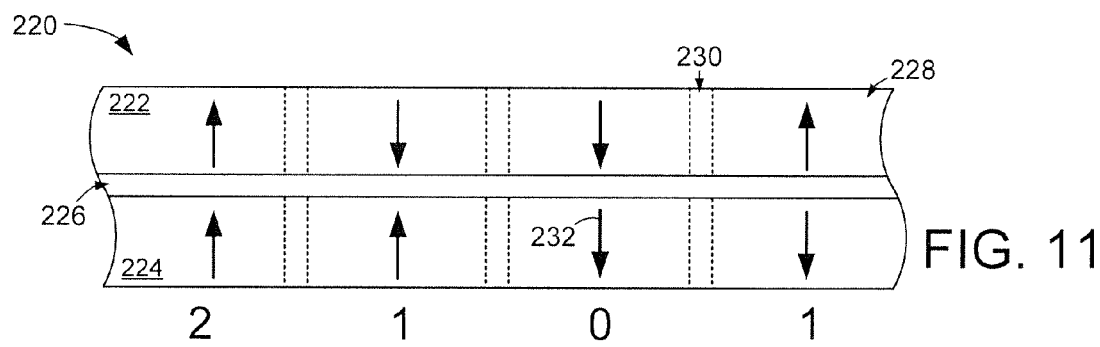
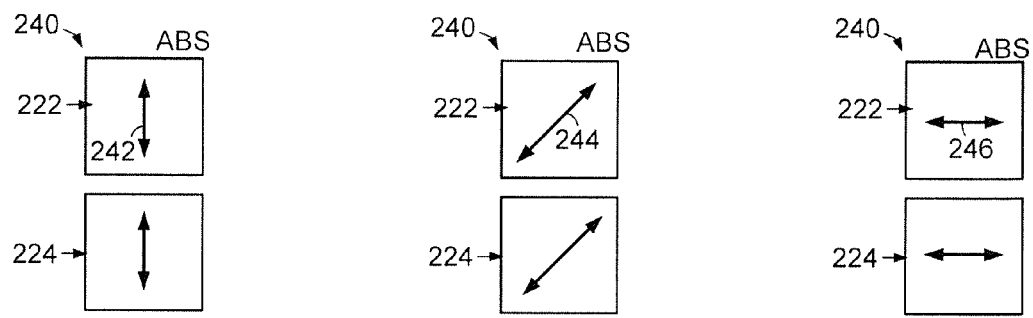

THREE DIMENSIONAL DATA STORAGE MEDIA

RELATED APPLICATIONS

This application is a continuation of U.S. patent application Ser. No. 15/165,637 filed on May 26, 2016 that issues as U.S. Pat. No. 9,697,857 on Jul. 4, 2017 which makes a claim of domestic priority under 35 U.S.C. § 119(e) to U.S. Provisional Application Nos. 62/1668,478 filed May 29, 2015, 62/169,779 filed Jun. 2, 2015, 62/169,611 filed Jun. 2, 2015, 62/169,609 filed Jun. 2, 2015 and 62/209,238 filed Aug. 24, 2015, the contents of which are incorporated by reference.

SUMMARY

A three-dimensional magnetic recording (3DMR) media can, in accordance with some embodiments, consist of a coupling layer disposed between first and second vertically stacked recording layers. The coupling layer can allow the respective recording layers to be individually heat selected to different first and second coupling strengths through application of heat from a heat source.

BRIEF DESCRIPTION OF THE DRAWINGS

FIG. 6 shows a block representation of a portion of an example data storage medium.

FIG. 7 graphs data associated with the example data storage medium of FIG. 6.

FIG. 8 is a block representation of a portion of an example data storage medium.

FIG. 9 conveys a block representation of a portion of an example data storage medium configured in accordance with some embodiments.

FIG. 10 displays a block representation of a portion of an example data storage medium arranged in accordance with various embodiments.

FIG. 11 illustrates a portion of an example data storage medium capable of being used in the data storage system of FIG. 1.

FIGS. 12A-12C respectively depict portions of an example data storage medium configured in accordance with assorted embodiments.

DETAILED DESCRIPTION

Figure 1:
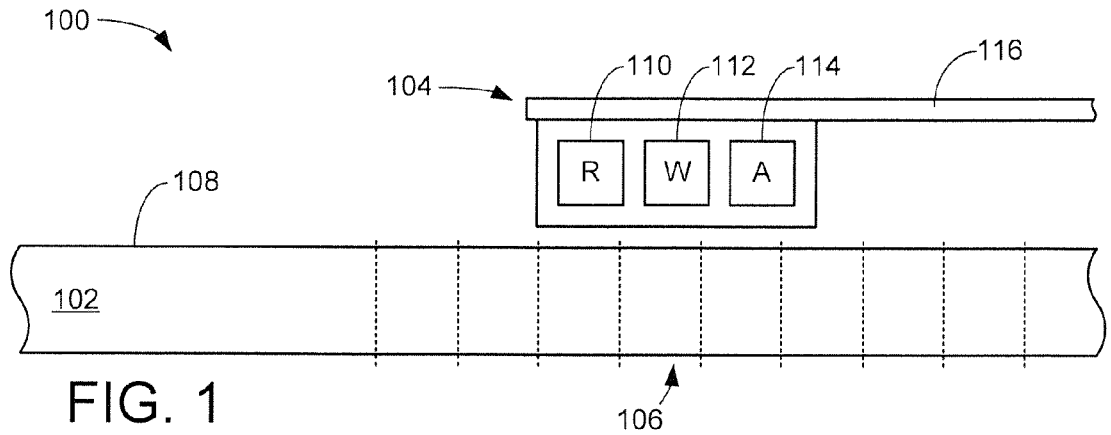
FIG. 1 depicts an example data storage system in accordance with some embodiments.

Assorted embodiments of the present disclosure are directed to a three-dimensional magnetic recording (3DMR) medium capable of being utilized in a data storage device. Through the assorted structures and methods, at least the data density and signal-to-noise ratio of a 3DMR data storage medium can be increased.

A 3DMR medium, in some embodiments, is configured to allow for the selective switching of magnetic coupling between vertically stacked recording layers. It is noted that the term "vertically stacked" is meant as multiple layers aligned along an axis perpendicular to an air bearing surface (ABS) of the 3DMR medium.

One of the challenges in data storage media with multiple recording layers is that a recording layer with low anisotropy (Hk) will suffer from erasure due to the writing process on the high-Hk layer of adjacent tracks, which can be characterized as write inflation. In other words, it can be difficult to record vertically stacked recording layers individually. It is also challenging to keep thermal stability in vertically stacked recording layers.

Controlling the coupling, such as exchange or antiferromagnetic coupling, between vertically stacked recording layers poses another challenge. On one hand, magnetic exchange coupling may promote switching of the bottom recording layer, but on the other hand, when switching the top recording layer only, such as during a second pass above the collective recording layers, erasure of the bottom recording layer can occur.

Successful multilevel recording utilizes the independent writing of the layers, which is well controlled, and that the written bits provide well separated bit levels while maintaining SNR, thermal stability, low spacing loss, etc., at competitive recording densities. Attempts to produce such independently written two-layer recording structures by combining Co-alloy perpendicular magnetic media with conventional magnetic recording have struggled to achieve the necessary trade-offs of separable write fields while maintaining high enough anisotropy of both layers for thermal stability in a thin structure providing limited spacing loss.

Applying microwave assisted magnetic recording (MAMR) increases the effective switching field and enables the writing of higher Hk recording layers, thereby increasing the thermal stability or decreasing the necessary thickness of the recording layers employed. Applying MAMR primarily to a magnetically harder (higher Hc and Hk) top recording layer also further separates the maximum effective write field difference that can be applied to the top and bottom recording layers. This is because each layer has a switching field distribution from its easiest to hardest grain to switch, and it is contemplated that no part of these distributions overlap between the recording layers for completely separate switching.

In a first example embodiment, a 3DMR medium utilizes high-Hk and low-Hk materials for respective top and bottom recording layers to provide effective write contrast by writing data via different write-assisted recording schemes for the different recording layers. Such write contrast allows data writing with ultrahigh anisotropy grains for both layers, so the write inflation and thermal-stability-vs-grain-volume issues can be addressed.

In a second example embodiment, a 3DMR medium is utilized in a method for recording data on very high Hk recording layers to achieve switching contrast between the vertically stacked recording layers by using different write assisted methods, such as heat assisted magnetic recording (HAMR) and MAMR.

In a fourth example embodiment, a 3DMR medium has a tuned Hk and Curie temperature (Tc) for top and bottom recording layers and a method to address the layers selectively by starting to record the bottom layer first, and then the top layer and its adjacent tracks are selectively rewritten.

In a fifth example embodiment, a 3DMR medium is configured to be written with MAMR means to increase the effective switching field and enable the writing of higher Hk recording layers, thereby increasing the thermal stability or decreasing the necessary thickness of the recording layers employed. Applying MAMR primarily to a harder top layer, with higher coercivity (Hc) and Hk, also further separates the maximum effective write field difference that can be applied to the top and bottom recording layers.

This is interesting because each recording layer has a switching field distribution from its easiest to hardest grain to switch between magnetic polarities, and it is contemplated that no part of these distributions overlap between the recording layers for completely separate switching. Applying MAMR to the top recording layer can increase the write field capability so that the entire distribution, from Hn to magnetic saturation (Hs) of the recording layer, can be moved to a higher value. Correspondingly, the softer layer Hs value, along with Hc and Hn values, can be increased toward the higher Hn value of the top MAMR layer, and a higher anisotropy, more stable soft layer material can be employed. It is noted that the hard layer has to be switched first.

In a sixth example embodiment, a MAMR layer has a higher exchange value or has a coupled granular and continuous (CGC) structure at the top for MAMR transmission. MAMR frequency is Hk dependent and MAMR may apply at different frequency to each layer. MAMR can reduce effective SFD, which can have value to the bottom layer even though higher field is not needed. If frequency separation is used, Hs of the soft layer may be increased slightly above Hn of the hard layer. It may also possible to have MAMR applied only to the soft top layer, if the soft layer is written second, and the MAMR is localized to the top layer, Hs soft may be raised very much higher than Hn of the hard layer.

In a seventh example embodiment, a 3DMR medium of a MAMR system has a top magnetic recording layer with a higher switching field than conventional media, and a softer bottom recording layer with a switching field distribution with minimized overlap to the hard recording layer, also consistent with Hn high enough for thermal stability. As a non-limiting example, a 3DMR medium can have Hs~9000 Oe, Hc~5500 Oe, Hn~2000 Oe. A soft recording layer can be configured with Hs~2000 Oe, with the distribution placing Hn<0 Oe, which is clearly unstable. A multilevel 3DMR medium might have a hard layer with Hs~12,000, Hc~9500, Hn~7000; and a soft layer Hs~7000, Hc~4500, Hn~2000.

In an eighth embodiment, 3DMR medium has three data levels and antiferromagnetically coupled recording layers. It is contemplated that a write process will employ HAMR technology to program data to the three level 3DMR system. In exchange coupled 3DMR approaches, more bits are packed into one single dot, such as two bits per dot, which requires a 4 level configuration that poses some operational issues. For instance, a 4 level configuration can have approximately a ~10 dB SNR loss if divided the total signal from 2 to 4 levels. A 4 level configuration also causes the write process to use more than one pass, which leads to a finite degradation in performance (data latency), or erasure conditions.

For 4 levels, gain is twice a maximum. Due to loss in SNR and uncertainty in writing, as one of the layers is physically further away from recording head, the actual data capacity gain (assume we can handle 10 dB SNR penalty) is limited. Also, the read back signal for a 4 level configuration is overlapped (physically), which contribute to the signal-to-noise loss.

In a ninth embodiment, a 3DMR medium has a first recording layer with high Tc (700-750K) and High Hk (>=70 kOe) and a second recording layer with low Tc (500-650K) and low Hk (25-60 kOe). Such a 3DMR medium can have individual recording layers selectively recorded in a first pass of writing to the bottom recording layer where the temperature of the bottom recording layer will be heated up above its Curie temperature ($T_{c1}$) and switched. However, the top recording layer and its adjacent tracks will also be erased due to the thermal spreading and lower $T_{c2}$ in the top layer. Next, the top recording layer is rewritten along with its adjacent tracks while the 3DMR medium is only heated up to a temperature above $T_c$ of the top recording layer but below the $T_c$ of bottom recording layer, which results in only the top recording layer and the previously erased adjacent tracks are selectively rewritten.

In a tenth embodiment, a first recording layer has high $T_c$ (800-1000 K) but low Hk (<=25 kOe) while a second recording layer has low $T_c$ (600-750K) but high Hk (35 kOe-140 kOe). An example recording scheme writes data to the bottom recording layer with HAMR with the temperature of bottom recording layer heating up above Curie temperature and switched in combination of applied field. However, the top recording layer and its adjacent tracks will also be erased due to the lower Hk in the top recording layer. Next, the top recording layer is rewritten along with its adjacent tracks while the 3DMR medium is either not heated or only heated up well below $T_{C2}$ and the switching of the top recording layer is pre-dominated by magnetic field writing. As a result, the bottom recording layer is not erased due to its much larger Hk and only the top recording layer and the previously erased adjacent tracks are selectively rewritten.

In an eleventh embodiment, a 3DMR medium is configured to mitigate write inflation by having a top recording layer constructed of a high transition temperature/low anisotropy material and a bottom recording layer formed of a high anisotropy and low transition temperature. The top recording layer configuration allows for writing with or without HAMR while keeping the bottom recording layer intact due to the high anisotropy. The top recording layer can have 800-1000K $T_c$ and less than 25KOe Hk while the bottom recording layer has 600-750K $T_c$ and greater than 35 kOe Hk. The writing process is expected to be HAMR for the bottom recording layer followed by rewriting the top layer and adjacent tracks with heating below the Tc of the bottom recording layer. Materials for the bottom recording layer can be FePt based granular compositions and the top layer can be CoPt based materials.

Antiferromagnetic coupling may stabilize magnetic states in top and bottom recording layers that have opposite magnetization directions. However, such coupling can block the writability of the bottom recording layer. The magnitude of coupling, either with exchange or antiferromagnetic coupling, corresponds with a strong temperature dependency where elevated temperatures reduce coupling. It is noted that the temperature to switch off exchange coupling is significantly lower than the Curie temperature of the magnetic materials used in the recording layers.

Hence, a twelfth embodiment use exchange and antiferromagnetic (AF) coupling between two vertically stacked magnetic recording layers to take advantage of magnetic switching of bottom and top recording layers separately as well as thermal stability of states of opposite direction on top of each other. A multilayer recording media structure can be configured with an AFC interface between top and bottom recording layers. The AFC interface promotes magnetic stability of the two recording layers with opposite magnetization directions.

A 3DMR medium, in a thirteenth embodiment, can be thermally selected to employ exchange or AF coupling between recording layers. Controlling the exchange/antiferromagnetic coupling can promote magnetic switching of the first (bottom) and second (top) recording layers. Structurally, an AF or exchange interface is disposed between the recording layers and promotes stable, opposite magnetizations in the recording layers. Application of heat to the AF or exchange interfaces allows a write field to selectively write to one, or both, recording layers, which increases writing efficiency.

The assorted embodiments can be understood with a review of FIGS. 1-15. FIG. 1 represents a portion of an example a data storage system 100. The system 100 has a rotatable data recording medium 102 and an adjacent data transducer 104. The data transducer 104 can employ HAMR and/or MAMR means, which may have different structural configurations and methods of use compared to a perpendicular data bit writer. It is noted that the addition of HAMR, or MAMR, means is not limiting or required and the transducer 104 can have less, or more, recording assisting structures.

Generally, the medium 102 and the transducer 104 may be incorporated into a hard disc drive (HDD) or other data storage device, such as a hybrid data storage drive employing a non-volatile solid-state memory. In a HDD embodiment, multiple axially arranged recording media (discs) are separately accessed by at least one data transducer 104 to read data to, and store data from, a host device.

Data can be stored in a number of concentric tracks 106 defined along an air bearing surface 108 of the medium 102. The data may be stored in the form of addressable user data sectors of fixed size along the tracks 106. Hydrodynamic features may be provisioned on a facing surface of the transducer 104 to enable the transducer 104 to be fluidically supported in close proximity to the medium surface 108 by atmospheric currents established during rotation of the medium 102.

The data transducer 104 is shown to include respective read (R), write (W) and assisting (A) elements 110, 112 and 114. The read element 110 may take the form of a magnetoresistive (MR) sensor. The write element 112 may include a write coil and one or more magnetically permeable cores. The assisting element 114 may have a light source, such as a laser diode, in a HAMR configuration or a frequency source, such as an oscillating material, in a MAMR configuration. A HAMR configuration may also employ a near field transistor (NFT) or other radiation beam and/or thermal energy source.

During a read operation, the read element 110 operates to sense a magnetization sequence written to the medium 102 along a portion of a selected track 106. During a write operation, the assisting element 114 alters the magnetic properties of a "dot" portion of the rotating medium 102. For example, a laser can project high powered irradiation to locally increase the temperature of the medium 102. The alteration of the dot allows the write element 112 to direct magnetic flux into selected portions of the medium 102 to write a desired magnetization sequence. The transducer 104 is supported by an actuator arm 116, which, responsive to a servo control system (not shown), radially positions the respective elements 110, 112 and 114 over particular data tracks 106 as required.

It will be appreciated that the system represented in FIG. 1 can be readily adapted for HAMR, MAMR, non-HAMR, and non-MAMR applications. For instance, the medium 102 can be constructed such as exchange coupled composite (ECC)+CGC perpendicular recording media.

For HAMR recording techniques generally depicted in FIG. 1, high anisotropy medium magnetic materials, such as iron-platinum (FePt) alloys, can be employed as recording layers. As noted above, a HAMR light source provides localized heating to temporarily reduce the anisotropy energy of the magnetic bit locations in the medium 102 so that the electromagnetic writer element 112 can write to the bit locations. The light beam in a HAMR application will tend to be many times smaller than its diffraction limit to avoid undesirable heating of adjacent areas, while the power level of the beam needs to be sufficiently high to accomplish the task of reducing the medium magnetic anisotropy energy.

Figure 2:
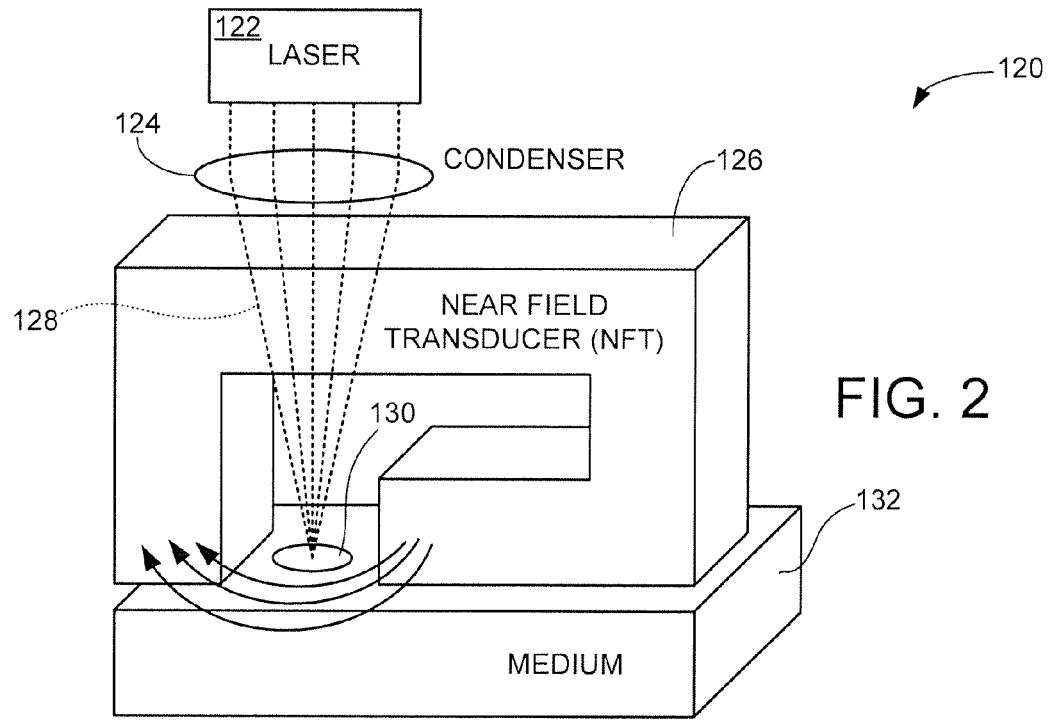
FIG. 2 illustrates an example HAMR data writer system suitable for use in the system of FIG. 1.

Near field transducers (NFTs) are sometimes used to meet these beam size and power level requirements. FIG. 2 represents an NFT-based HAMR system 120 with a light source (e.g., incident laser) 122, a condenser 124 and an NFT 126. The condenser 124 represents a first stage and the NFT 126 represents a second stage. These elements cooperate to direct an electromagnetic radiation (e.g., light) beam 128 onto a small spot 130 on a medium 132. It is contemplated that the spot 130 has a diameter of no more than about 30 nm and is provided with sufficient transmitted power as to reduce the magnetic coercivity and anisotropy energy of the medium 132.

The NFT 126 enhances the light efficiency by combining various effects such as plasmonic resonance, surface enhancement, lightening rod collection, etc. Using an enhanced overcoat layer on the medium 132 with high efficiency plasmon response characteristics, as disclosed herein, can further improve the laser-medium coupling efficiency during HAMR recording operations.

For MAMR recording techniques that can be utilized in the transducer 104 of FIG. 1, a particular frequency, or range of frequencies, which do not necessarily have to be microwave frequencies, excite the medium by activating one or more spin torque oscillators (STO) to allow data to be written easier and faster.

Figure 3:
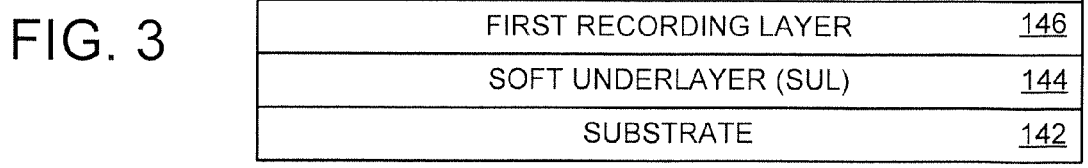
FIG. 3 displays a block representation of a portion of an example data storage medium constructed and operated in accordance with some embodiments.

FIG. 3 is a schematic depiction of various layers of an example recording medium 140 useful in a data storage system such as described above in FIGS. 1 and 2. Other media configurations can readily be used, including configurations with different numbers and/or orderings of layers. It will be appreciated that FIG. 3 is functional in nature and is not drawn to scale so that each of the respective layers shown in FIG. 3 will have its own respective thickness. Each layer may be formed from a plurality of layers of like or different construction. Seed layers, intermediate layers, coupling layers, etc. may also be used as desired.

A base substrate 142 provides mechanical support for the medium 140. A recording structure is formed on the base substrate 142 made up of a number of layers. A soft magnetic underlayer (SUL) 144 is formed on the substrate, such as via sputtering. The SUL 144 provides a return path for magnetic flux during a data recording operation. One or more intermediate layers, also referred to as interlayers (IL), can be formed on the SUL to establish a magnetic easy axis in the perpendicular direction, and may have high surface roughness to induce grain separation in the subsequently deposited recording layers. In some embodiments, a first recording layer 146 is positioned atop the SUL and consist of a first type of data recording, such as perpendicular recording, MAMR, HAMR, and bit patterned media (BPM).

One or more intermediate layers 148 are formed on the first recording layer 146 to separate the second recording layer 150 from the first recording layer 146. The respective recording layers 146 and 150 may be provided with lower layers having relatively higher magnetization, anisotropy and exchange coupling levels and upper layers with softer magnetization and anisotropy. The second recording layer 150, in some embodiments, is configured with a different type of data recording than the first recording layer. As such, any number of suitable recording structure configurations can be used in the recording layers 146 and 150.

A protective overcoat layer 152 is formed on the topmost recording layer 150. Various configurations of the protective overcoat layer 152 protects the medium 140 against environmental effects, such as inadvertent contact between the medium 140 and the transducer (e.g., 104 in FIG. 1). The overcoat layer 152 can further provide increased energy coupling between the medium 140 and a HAMR recording system such as discussed in FIG. 2.

As a non-limiting example, two stacked recording layers which have different coercivities can be written using different write currents applied to a write head, but the same concept can be applied to any system of recording layers where a cascade of writing conditions, one for each recording layer, can be arranged such that subsequent write conditions will not destroy the information written in other layers by earlier write conditions.

Figure 4:
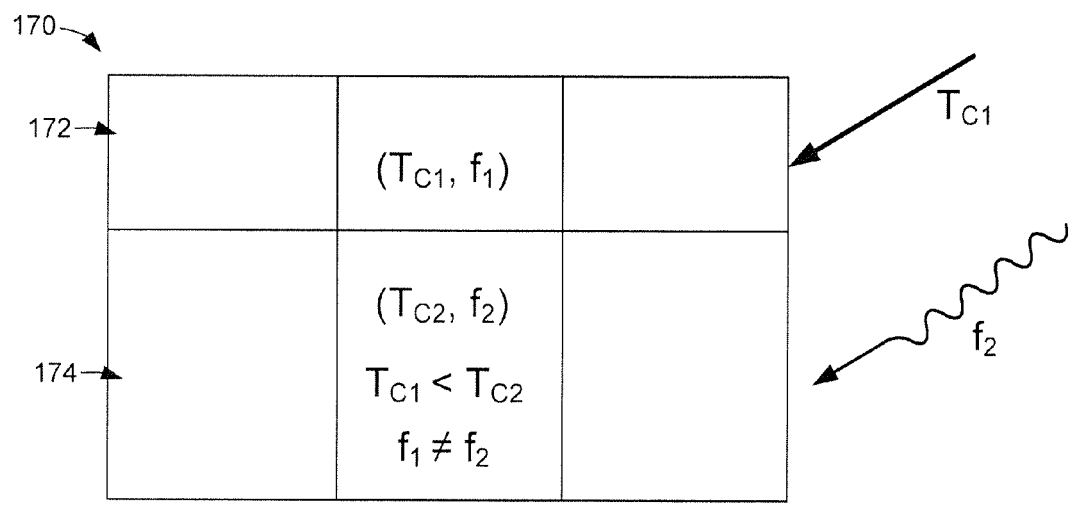
FIG. 4 represents a portion of an example data storage medium capable of being used in the data storage system of FIG. 1.

Although no recording scheme or combination is required, the use of two different writing schemes, such as HAMR and MAMR, to write information on two vertically stacked magnetic layers can provide optimized write contrast and data writing performance. Because both HAMR and MAMR belong to energy-assisted magnetic recording, they can be used to write magnetic grains with ultrahigh magnetic anisotropy. FIG. 4 illustrates a cross-sectional line representation of a portion of an example data storage medium 170 constructed and operated in accordance with various embodiments.

As shown, a first (top) recording layer 172 is configured to be written with a HAMR recording scheme and a second (bottom) recording layer 174 is configured to be written with a MAMR recording scheme. It is noted that the recording layers 172 and 174 utilize different frequencies and temperatures that provides high writing contrast and the ability to write data to a selected one recording layer.

As a non-limiting example, suppose there is a 3DMR medium with two vertically stacked magnetic layers with no interlayer exchange coupling. Each magnetic layer has a very high magnetic anisotropy (~1×108 erg/cm3). The Curie temperatures for the two layers are made different (as shown by $T_{c1}$ and $T_{c2}$ in FIG. 4). The ferromagnetic resonant frequencies for the two layers are also made different (as shown by $f_1$ and $f_2$ in FIG. 4). It is noted that the stacking order of the respective layers 172 and 174 is not fixed. Under this setup, one can use HAMR to implement recording on one layer, and use MAMR on the other layer. This recording scheme allows for relatively thin magnetic layers as compared to conventional 3DMR that is based on perpendicular magnetic recording (PMR) schemes, to provide a magnetic recording system with better readback signal and lower demagnetization fields.

Figure 5:
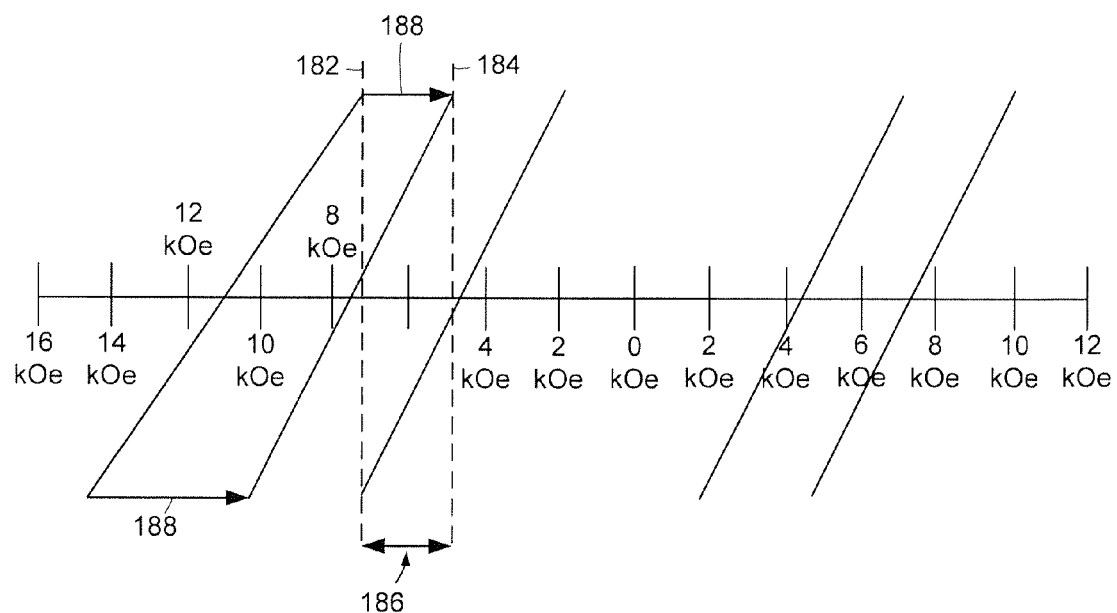
FIG. 5 plots operational data corresponding with an example data storage medium operated in accordance with some embodiments.

FIG. 5 plots how a MAMR field enables reduced overlap of the hysteresis loops of the writable hard and soft recording layers. The MAMR layer, represented by segmented line 182, has much higher Hn than the conventional hard layer, as represented by segmented line 184 but writes at the same field as the conventional layer when the MAMR Field is on. Region 186 represents the overlap of hard and soft recording layers magnetic field and arrows 188 corresponds with the reduction of magnetic field corresponding with MAMR operation.

It is contemplated that a bottom recording layer can be constructed as a FePtX:Y granular media with the top recording layer comprising a CoPtX based materials and spacer and/or seed layers in between. A bottom recording layer could be deposited at elevated temperature to achieve the chemical ordering needed for high anisotropy while the top recording layer could be deposited at room temperature for the case of CoCrPt alloy or deposited at elevated temperatures if CoPt or FePd ordered alloys. The same sequence can be applied for cases of 3DMR with multiple sub-layers (N>=2). The concept can be applied for granular media or BPM.

FIG. 6 illustrates a line representation of a portion of an example data storage medium 190 constructed and operated in accordance with various embodiments. As shown, each recording layer 192 and 194 has different Hk and Tc configurations. During writing of the bottom recording layer 194, the temperature of bottom recording layer 194 will be heated up above Curie temperature and switched. However, the top recording layer 192 and its adjacent tracks will also be erased due to the thermal spreading and lower Tc in the top layer, as illustrated by the switching extent 196 that spans multiple vertically stacked data regions 198.

FIG. 7 plots operational data for an example data storage medium. It is noted that materials for the top and bottom recording layers can be respectively be selected to provide a tuned balance between anisotropy and Curie temperature, as shown.

FIG. 8 is a line representation of a portion of an example data storage medium where a top recording layer and its adjacent tracks are rewritten. The media stack is only heated up to a temperature above Tc of the top recording layer 192 but below the Tc of bottom recording layer 194. Thus, only the top recording layer 192 and the previously erased adjacent tracks are selectively rewritten, as represented by switching extents 200 corresponding with individual data regions 198.

FIG. 9 shows an example writing of data to a vertically stacked data region 202 with an antiferromagnetically selectable intermediate layer. The magnetically harder bottom recording layer 204 is recorded to a first magnetic polarity in a first run where heat is applied to deactivate the antiferromagnetic coupling (AFC) of the intermediate layer, as illustrated by the lefthand region 202. Here, the magnetically softer top recording layer 206 is switched to the same magnetization direction as the bottom recording layer 204. It is noted that the applied heat enables easier switching of the bottom recording layer 204.

The righthand data region 202 shows how data recording to the top recording layer 206 occurs only when the magnetization of the top recording layer 206 needs to switch in the opposite direction of the bottom layer 202. In such an event, a magnetic field is applied with no heat being applied to the intermediate layer, which allows the AFC promote promotes the stability of the bottom layer 204.

Turning to FIG. 10, a 3DMR medium has vertically stacked recording layers 204 and 206 separated by a selectable exchange coupling (EC) intermediate layer. The exchange coupling of the intermediate layer promotes magnetic switching of the bottom recording layer 204 (ECC). The writing of the magnetically harder bottom recording layer 204 is shown by the lefthand data region 210. Here, the magnetically softer top recording layer 206 is magnetically switched in the same magnetization direction with no heat being applied to leverage the exchange coupling and enable easier switching of the bottom recording layer 204.

Recording of the top recording layer 206 occurs only when the magnetization of the top recording layer 206 needs to switch in the opposite direction compared to the bottom recording layer 204. A magnetic field is applied with a transducing head activated and then the EC is switched off via the application of heat, which blocks the exchange coupling induced switching of the bottom recording layer 204, as illustrated by the righthand data region 210.

It is contemplated that the recording layers 202 and 204 can be configured to be accessed and written to via different recording schemes, such as perpendicular recording (PMR), microwave assisted magnetic recording (MAMR), and heat assisted magnetic recording (HAMR) recording schemes. In the case of MAMR, the respective recording layers can be configured with different resonance frequencies to allow individual selection and access.

FIG. 11 shows a line representation of a portion of an example 3DMR data storage medium 220 arranged in accordance with various embodiments to antiferromagnetically couple a first recording layer 222 to a second recording layer 224 with a coupling layer 226. As shown, the coupling layer 226 continuously extends between the recording layers 222 and 224 and is constructed of a non-magnetic material capable of maintaining antiferromagnetic coupling. It is noted that each recording layer 222 and 224 can have a plurality of magnetic regions 228 separated by non-magnetic regions 230, as displayed by segmented lines, which can correspond with bit patterned media (BPM).

However, BPM is not required as one, or both, recording layers 222 and 224 can be continuously magnetic and comprise a plurality of magnetic grains. Regardless of the magnetic configuration of the recording layers 222 and 224, the vertically stacked orientation of the first 222 and second 224 recording layers, as measured perpendicular to the air bearing surface (ABS), allows multiple data bits 232 to be concurrently stored for each bit's portion of the ABS.

The 3DMR medium 220 in FIG. 11 shows an anisotropy direction to be aligned perpendicular to the ABS. The antiferromagnetic coupling between the recording layers 222 and 224 can be tuned, along with the magnetic thickness (Mrt) of the recording layers 222 and 224, to be about the same. The strength of antiferromagnetic coupling is relative strong such that the each recording layer grain is thermally stable when the first 222 and second 224 layer magnetizations are either in parallel or in antiparallel states. We note that although the anisotropy direction of each recording layer 222 and 224 is shown to be aligned perpendicular to the ABS, other anisotropy orientations (media magnetization direction at equilibrium states) are possible, such as longitudinal or tilted with respect to the ABS.

The antiferomagnetically coupled recording layers 222 and 224 allow for the data bits 232 of vertically aligned magnetic grains to be stable in at least three different logic states. In the non-limiting example of FIG. 11, a first logic state (2) is present when vertically stacked data bits 232 each have a common, positive polarity and a second logic state (0) is present when stacked data bits 232 each have a common, negative polarity. A third logic state (1) is present when vertically stacked data bits 232 have different polarities.

FIGS. 12A, 12B, and 12C respectively show block representations of an example recording portion 240 of a data storage medium arranged in accordance with some embodiments. As shown in FIG. 12A, the recording layers 222 and 224 can each be arranged with an easy axis of anisotropy 242 to be perpendicular to the ABS. FIG. 12B conveys how the easy axis of anisotropy 244 for the recording layers 222 and 224 can be tilted with respect to the ABS. While not required or limiting, the easy axis of anisotropy 246 displayed in FIG. 12C is oriented parallel to the ABS. The ability to orient the anisotropy ($H_k$) of the recording layers 222 and 224 allows the recording portion 240 to be tuned to accommodate a diverse variety of data storage environments and data densities.

Figure 13:
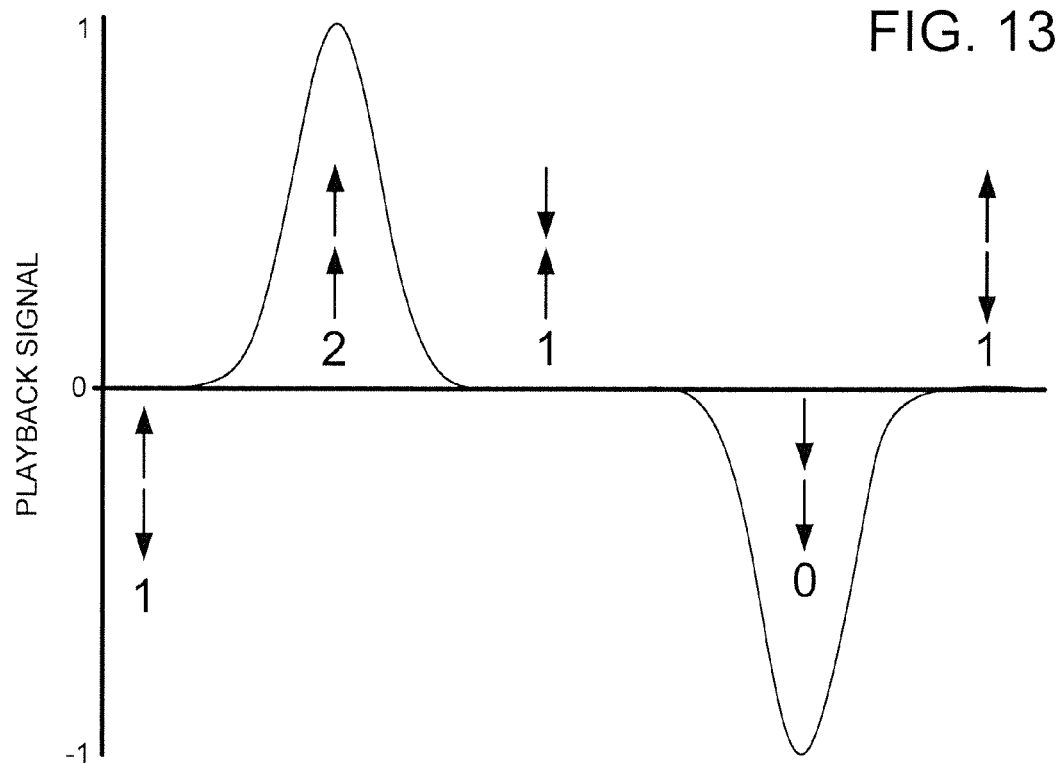
FIG. 13 plots operational data associated with an example data storage medium.

FIG. 13 plots operational data for an example data storage medium configured in accordance with some embodiments. The playback signal for the various logic states, which correspond with the logic states shown in FIG. 11, illustrate how well defined transitions are present between different bits. That is, adjacent data bits that each comprise vertically stacked magnetic polarities can be easily read and discerned due to the three distinct playback signal levels for the respective logic states.

Figure 14:
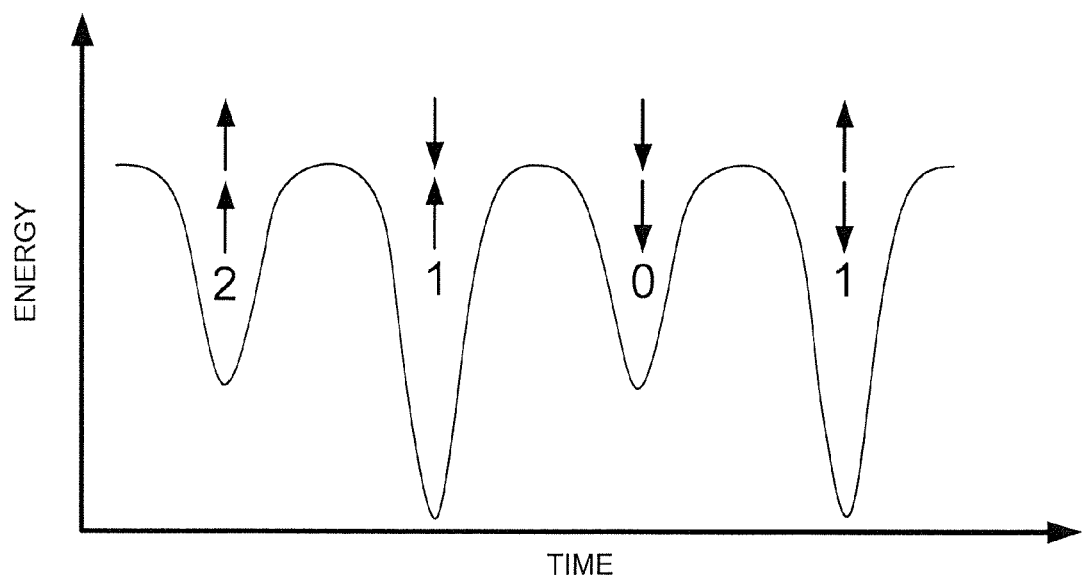
FIG. 14 graphs operational data corresponding with an example data storage medium.

FIG. 14 graphs data associated with an example data storage medium constructed in accordance with various embodiments. The non-overlapping energy profiles of the various logic states convey the energy surface of different magnetization states and the energy barrier between the states for the coupled particles (dots). The results show that with an antiferromagnetic coupling, all three states can be thermally stable for long time.

Figure 15:
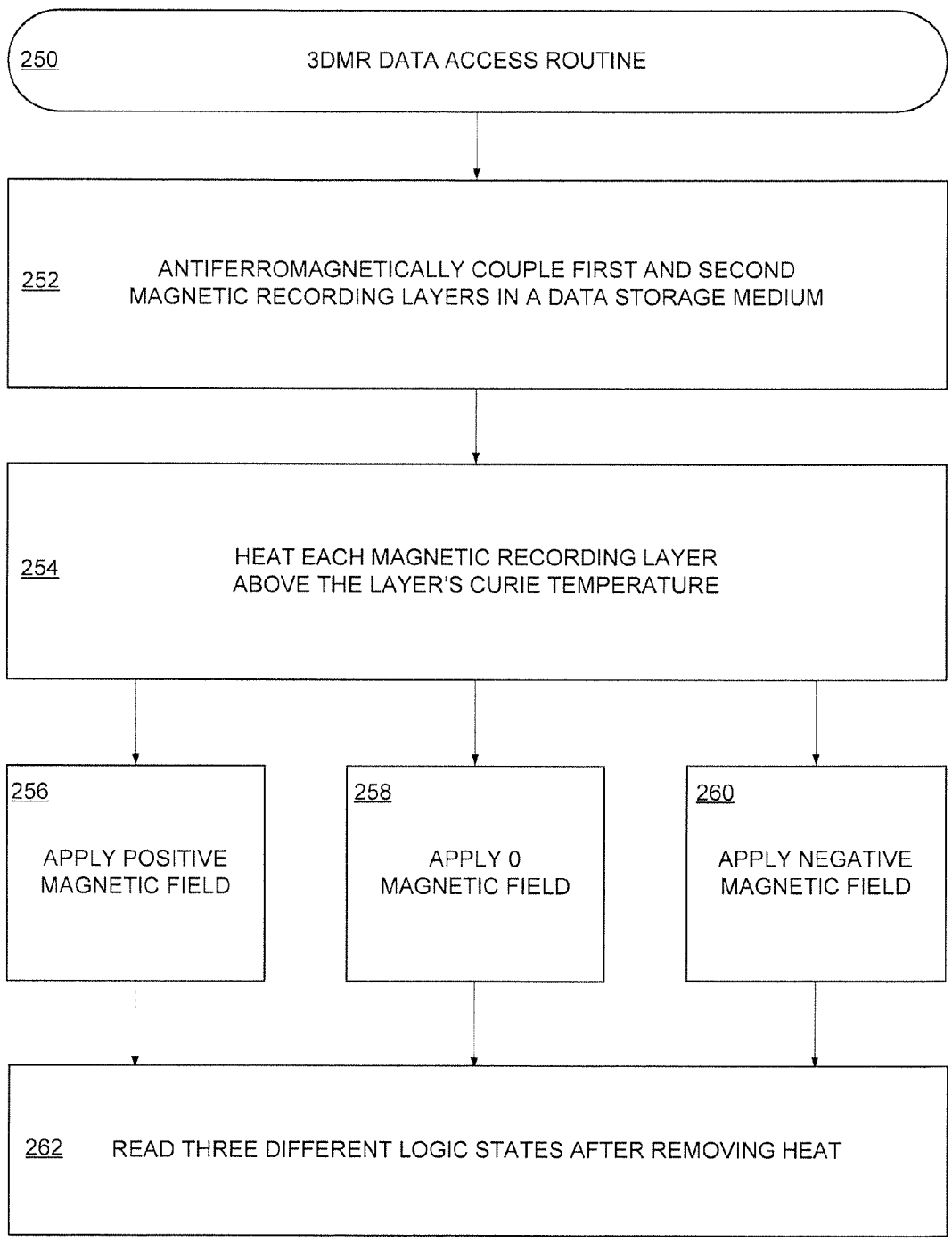
FIG. 15 is a flowchart of an example 3DMR data access routine carried out in accordance with some embodiments.

FIG. 15 is a flowchart of an example 3DMR data access routine 250 that is carried out in accordance with various embodiments to utilize a 3DMR data storage medium with a data transducing head, such as transducer 104. The data storage medium is initially provided in step 252 with first and second magnetic recording layers anti ferromagnetically coupled together. Step 254 then heats each magnetic recording layer above the respective layer's Curie temperature to lower the coercivity of each layer and allow alteration of the constituent data bit magnetization.

The heating of the magnetic recording layers can produce three different logic states depending on the magnetic polarity applied by a data writer. Step 256 applies a positive polarity magnetic field while the recording layers are heated, which results in a (2) logic state to be programmed with each data bit having the imparted positive polarity. A (1) logic state can be programmed with step 258 applying a zero, or very little, magnetic field and allowing the antiferromagnetic coupling to set the data bits to opposite polarities. Alternatively, a negative polarity magnetic field can be applied in step 260 on the recording layers to write a (0) logic state.

Subsequent to the writing of data in steps 256, 258, and/or 260, heat is removed from the programmed data bits and step 262 proceeds to read one of three different logic states from the recording layers. That is, a programmed data bit is cooled below Curie temperature and a data reader senses the collective polarities of the vertically stacked data bits to detect one of three different logic states.

In a data writing process, both writer and a heating element is turned on. In HAMR data writing, the heating element laser diode couples light into near field transducer. When the write field is in one direction, vertically stacked magnetizations of the recording layers 222 and 224 will be aligned in the same direction. When the write field is 0, then the media dots enter to an antiparallel state, with a net 0 field/flux output. In playback, all antiparallel states are treated as one state (1). Both layer dots magnetization pointing up and down were treated as two separate states (0 and 2).

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a three dimensional magnetic recording medium having a coupling layer disposed between and contacting first and second recording layers, the first recording layer positioned on an air bearing surface (ABS) and having a greater magnetic coercivity and anisotropy than the second recording layer, the first recording layer storing data written via a first energy assist scheme, the second recording layer storing data written via a second energy assist scheme, the first and second energy assist schemes being different.

2. The apparatus of claim 1, wherein the second recording layer is separated from the ABS by the first recording layer and the coupling layer.

3. The apparatus of claim 1, wherein the first energy assist scheme is microwave assisted magnetic recording.

4. The apparatus of claim 1, wherein the second energy assist scheme is heat assisted magnetic recording.

5. The apparatus of claim 1, wherein the anisotropy of the first and second recording layers are each greater than 108 erg/cm$^3$.

6. The apparatus of claim 1, wherein the first and second recording layers have different Curie temperatures.

7. The apparatus of claim 1, wherein the data stored in the second recording layer is accessible individually with a data reader separated from the three dimensional recording medium.

8. The apparatus of claim 1, wherein the first and second recording layers are coupled together via antiferromagnetic coupling.

9. The apparatus of claim 8, wherein the first and second recording layers are coupled together via exchange coupling.

10. The apparatus of claim 1, wherein the first and second recording layers are vertically aligned.

11. An apparatus comprising a three dimensional magnetic recording medium having a coupling layer disposed between and contacting first and second recording layers, the first recording layer positioned on an air bearing surface (ABS) and having a greater magnetic coercivity, saturation, nucleation field, and anisotropy than the second recording layer, the first recording layer storing data written via a first energy assist scheme, the second recording layer storing data written via a second energy assist scheme, the first and second energy assist schemes being different.

12. The apparatus of claim 11, wherein the magnetic saturation of the first recording layer is 12000 Oe.

13. The apparatus of claim 11, wherein the magnetic coercivity of the first recording layer is 9500 Oe.

14. The apparatus of claim 11, wherein the magnetic nucleation field of the first recording layer is 7000 Oe.

15. The apparatus of claim 11, wherein the magnetic saturation of the second recording layer is 7000 Oe.

16. The apparatus of claim 11, wherein the magnetic coercivity of the second recording layer is 4500 Oe.

17. The apparatus of claim 11, wherein the magnetic nucleation field of the second recording layer is 2000 Oe.

18. A system comprising a three dimensional magnetic recording medium having a coupling layer disposed between and contacting first and second recording layers, each recording layer organized into bit patterned media (BPM) with vertically aligned magnetic grains, the first recording layer positioned on an air bearing surface (ABS) and having a greater magnetic coercivity and anisotropy than the second recording layer, the first recording layer storing data written via a first energy assist scheme, the second recording layer storing data written via a second energy assist scheme, the first and second energy assist schemes being different.

19. The system of claim 18, wherein the first recording layer has a first logic state, the second recording layer has a second logic state, and the combination of the first and second recording layers provide a third logic state.

20. The system of claim 18, wherein the magnetic anisotropy of the first and second recording layers are each aligned perpendicular to the ABS.

* * * * *